Sept. 30, 1969   O. A. KRAUER ET AL   3,470,438
MOTOR CONTROL SYSTEM
Filed March 8, 1967
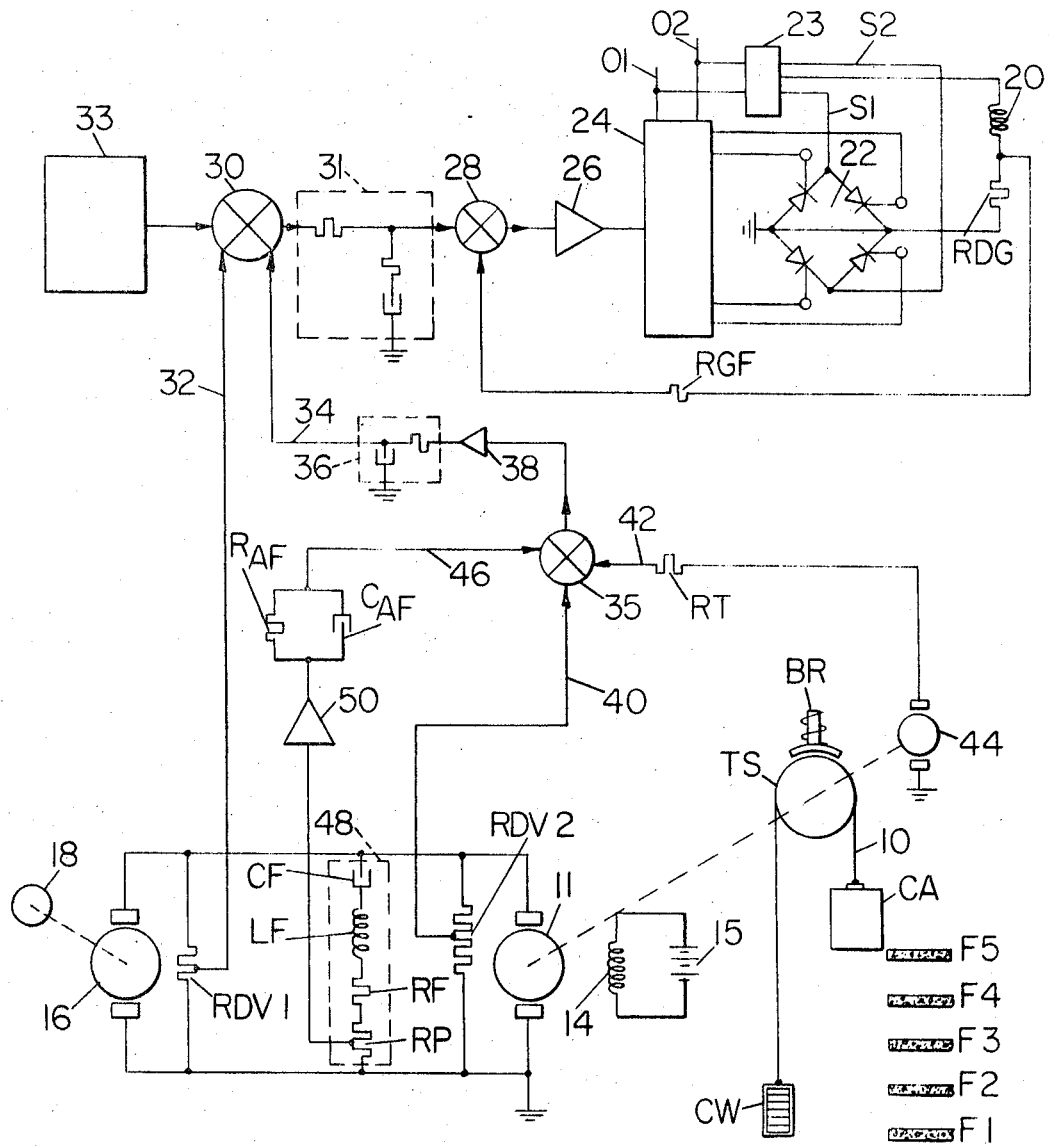
INVENTORS,
OTTO ALBERT KRAUER,
SIDNEY HOWARD BENJAMIN
BY R. T. Mayr ATTORNEY United States Patent Office 3,470,438
Patented Sept. 30, 1969

3,470,438
MOTOR CONTROL SYSTEM
Otto Albert Krauer, Tuckahoe, and Sidney Howard Benjamin, Brooklyn, N.Y., assignors to Otis Elevator Company, New York, N.Y., a corporation of New Jersey
Filed Mar. 8, 1967, Ser. No. 621,535
Int. Cl. H02k 27/20; H02p 7/80
U.S. Cl. 318—312                    15 Claims

ABSTRACT OF THE DISCLOSURE

A high performance servo system particularly suitable for controlling the speed of a motor which is subjected to a variety of loads. The feedback loops of the system include networks which produce signals representing the steady-state load components of the motor armature terminal voltages. These signals cancel out the adverse effects load variations would otherwise have on the system.

---

This is an invention in the art of motor control. It is particularly concerned with a closed loop system for controlling the speed of a variable speed motor which undergoes changes in load from one cycle of operation to another.

Various arrangements of high performance closed loop systems for motor speed control have been proposed. Some of these suggest the use of armature voltage feedback to regulate speed. The advantage of such arrangements is that inherently they are substantially stable. Unfortunately, the presence of motor loads in these arrangements demands accurate load compensation if precise speed regulation is desired. Such compensation is hard to achieve in those applications where the motor loads vary from operation to operation. For this reason, speed regulation by tachometer generator feedback has been suggested. This eliminates the necessity for accurate load compensation but introduces problems of stability which in themselves, can be difficult and expensive to overcome.

It is an object of this invention to provide a closed loop speed control system for a motor which is stable and provides precise speed regulation whether the load on the motor remains uniform or changes from operation to operation.

Another object is to provide a simplified and inexpensive arrangement of a closed loop speed control system for a motor that employs armature voltage feedback and yet provides precise speed regulation irrespective of variations in the magnitude of the load on the motor.

One arrangement of a closed loop system for controlling the speed of a motor which is subject to a variety of loads is disclosed in the co-pending application of Otto Albert Krauer, Kenneth Raymond Brooks and Sidney Howard Benjamin, Serial No. 495,585, for an "Elevator Control System," filed Oct. 13, 1965, and assigned to the same assignee as this application. That application shows a system for regulating speed which requires no load compensation and which derives all its feedback control signals substantially independently of those factors which are effected by load variations.

In carrying out the present invention, an arrangement different from that disclosed in the above identified application is employed. In contrast to that arrangement, some of the feedback control signals of this arrangement, when derived, do contain those factors which are effected by load variations and which would adversely effect the system but before these signals perform any regulating function substantially all such factors are eliminated from them.

A preferred embodiment of this invention appropriate for controlling the operation of a high speed passenger elevator is shown in the drawing and will be described in detail hereinafter. From this, other motor control systems in which the invention is also appropriate for use will suggest themselves to those skilled in the art.

Featured in the herein described embodiment is a voltage source including a power amplifier for supplying excitation voltage of variable magnitude to a control winding of a direct current elevator hoisting motor to control the speed of the motor armature and the various masses it drives. The amplifier operates in accordance with a pattern signal applied to its input circuit by speed dictating equipment. Two feedback networks are connected to the input circuit of the amplifier. Each of these includes a voltage dividing circuit connected across the control winding of the motor, which in this case is its armature. Both of these circuits derive signals which are proportional to the armature terminal voltage. In addition, one of the feedback networks also includes a tachometer generator, mechanically coupled to the armature shaft, and a control network including a circuit connected across the armature terminals. The tachometer generator produces signals proportional to the speeds of the armature while the control network derives signals proportional to the first and second derivatives of those speeds. These signals, representing speed and its derivatives, are differentially combined with those produced by the voltage divider in their feedback network to obtain signals representative of the torques required to overcome the torques which act on the armature of the motor as a result of the various loads applied thereto. The signals, representing load torques, obtained in this manner are applied to the input circuit of the power amplifier with a polarity which is opposite in sense to that of the signals applied thereto by the other feedback network. The effect of this is to produce signals which, in turn, operate in opposition to the pattern signal from the speed dictating equipment to control the excitation supplied to the speed control winding of the motor.

Other features as well as additional objects and advantages of this invention will be apparent from the following description and appended claims when considered in conjunction with the drawing. The only figure of the drawing shows a schematic representation of a closed loop system arranged in accordance with the invention to control the speed of an elevator hoisting motor.

In the drawing, a traction sheave TS for the hoist ropes 10 of an elevator car CA and its counterweight CW is mounted on the shaft of the rotating element, or armature, 11 of a direct current elevator hoisting motor. A mechanical brake, represented by the brake shoe BR, is provided to be applied to a brake drum (not shown) mounted on the shaft of armature 11 in any satisfactory well known manner. Main field 14 of the elevator hoisting motor is connected across a constant potential source conveniently represented by battery 15. In accordance with the well known Ward Leonard principles of variable voltage control, motor armature 11 is connected across the output of a direct current generator whose armature 16 is mounted on the same shaft as rotor 18 of an alternating current drive motor, not otherwise shown. Main field 20 of the direct current generator is connected in series with resistor RDG between the center tap of the secondary of transformer 23 and the output circuit from the silicon controlled rectifiers of reversible single phase full wave rectifying circuit 22. The input connections to circuit 22 are across the secondary of transformer 23 by way of lines S1 and S2. The primary of transformer 23 is connected across a source of single phase 60 cycle alternating current indicated by lines O1 and O2. This same source is also connected to the input circuit of control device 24, which may suitably take the form of a magnetic amplifier. The output circuit of device 24 is connected to the gates of the silicon controlled rectifiers of circuit 22. A control circuit to device 24 is provided from driving amplifier 26. Connected to the input of driving amplifier 26 is summation network 28, which may suitably include a static element operational amplifier. Of the two input circuits to network 28, one is connected in a degenerative feedback arrangement through resistor RGF from generator field 20 and the other is coupled to summation network 30 through an R.C. stabilizing phase lag network 31. Summation network 30 which also may suitably include a static element operation amplifier, is arranged with three input circuits. The first of these is connected by way of network 32 to a voltage divider represented in the form of resistor RDV1 connected across armature 11 of the elevator hoisting motor, the second is connected to a reference speed signal source 33, and the third is connected by way of network 34 to the output of summation network 35 through filter 36 and inverting amplifier 38.

Reference speed signal source 33 may be any suitable source of potential, the magnitude of whose output varies in accordance with a predetermined pattern so as to control the hoisting motor in a desired manner. In any run of an elevator car such an output signal would accelerate and decelerate the motor as rapidly as is possible from standstill to its running speed and back again without exceeding those magnitudes of acceleration and deceleration and rates of change thereof that are commensurate with passenger comfort.

Connected to summation network 35 are three input circuits. The first of these, 40, is connected from a voltage divider circuit represented in the form of resistor RDV2 connected across armature 11 of the elevator hoisting motor. The second input circuit, 42, is connected through resistor RT to the output of a speed responsive signal source in the form of tachometer generator 44 which is coupled for rotation to the shaft of motor armature 11. The third of the input circuits, 46, is connected to network 35 through parellel resistor $R_{AF}$ and capacitor $C_{AF}$ to control circuit 48 through inverting amplifier 50. Control circuit 48 is also connected across armature 11 of the elevator hoisting motor.

Before proceeding to a detailed description of the system in operation, it will facilitate matters to explain the function and arrangement of control circuit 48. It is well known that the terminal voltage applied to the armature of a motor causes a current to flow in the armature winding and that the torque produced by a component of this current accelerates and decelerates the armature of the motor and the masses it drives. In an elevator system, such as that shown in the drawing, the masses driven by motor armature 11 includes the car CA and its counterweight CW which outweighs the empty car by a prescribed percentage of the maximum capacity of live load that the car is designed to carry. In other words, depending upon the magnitude of the live load in the car, the masses driven by the motor may be either balanced, in which case the car and its live load weigh the same as the counterweight, or unbalanced in which case the car and its live load are either lighter or heavier than the counterweight. When the masses are unbalanced a load is placed upon the motor and in order to produce uniform modes of acceleration and deceleration regardless of this load, the acceleration component of the armature terminal voltage and the current it produces vary in magnitude as the load on the motor varies.

In addition to their acceleration components, the armature terminal voltage and its resulting current also contain second components whenever the motor is under a load. These second, or load components act to support the unbalanced portion of the masses and prevent it from descending undesirably. They vary in magnitude as the load on the motor varies so that under all load conditions the motor develops sufficient torque to overcome the torque acting on the armature as a result of the unbalanced weight suspended from the traction sheave. Of course, when the live load in the car is just enough to cause the masses on both sides of the traction sheave to be in balance so that the motor operates under a no-load condition, neither the armature terminal voltage nor the current it produces contains any load component.

Neglecting motor losses, under the no-load, or balanced masses, condition the current that flows in motor armature 11 as a result of the voltage applied thereto is proportional to the acceleration or deceleration, as the case may be, of armature 11. The magnitude of this current and that of the terminal voltage necessary to produce it depends on the resistance of the motor armature, the inductance of the motor armature, and the inertia of both the motor armature and the balanced masses it drives at no-load. These components of resistance, inductance and mass comprise an electro-mechanical system which is mathematically definable by a second order differential equation. An electrical analogue of this second order electro-mechanical system at balanced load is itself mathematically definable by a second order differential equation. One such analogue is an RLC circuit wherein R=the resistance of the motor armature,
L=the low frequency inductance of the motor armature, and
C=the electrical capacitance equivalent to the mechanical inertia of the motor armature and the masses it supports at balanced load.

The magnitude of the capacitance in this analogue circuit is well known to be the quotient of the total moment of inertia of both the motor armature and the balanced masses it drives at no-load, with respect to the motor shaft, divided by the product of two of the motor constants, one being the torque per ampere and the other the electromotive force per radian of revolution. The magnitude of the inductance in this analogue circuit is determinable by conducting a low frequency response test to obtain a Bode plot of an open loop system including the hoisting motor. The magnitude of the inductive reactance of the motor armature is equal to the magnitude of the analogous capacitive reactance of the tested system at the corner frequency determined by the test. Thus once the magnitude of the analogous capacitive reactance and the corner frequency are known, the magnitude of the low frequency inductance in the armature can be determined. The magnitude of the inductive component of the analogue RLC circuit of the forementioned electromechanical system is equal to the inductance determined in this manner. The magnitude of the resistance component of the analogue RLC circuit, of course, is equal to the measured motor armature resistance.

Control circuit 48 includes components of resistance RF and RP, inductance LF and capacitance CF whose values preferably are so proportionate to the corresponding resistance, inductance and capacitance values of the electrical analogue described above, that when the masses are balanced so that there is no net load on the motor the current flowing through circuit 48 owing to the applied motor armature terminal voltage is substantially a miniature reproduction of the current through motor armature 11. Under this no-load condition, the motor armature current contains only an acceleration component and the current through circuit 48 is proportional to it and thus to the acceleration and deceleration of the motor armature.

In choosing the magnitudes of resistances RF and RP, inductance LF and capacitance CF so that the current through circuit 48 is substantially a miniature reproduction of the current through motor armature 11 at no-load a straight-forward and well known method may be used. Select the magnitude of inductance LF so that it is related to the magnitude of the inductance of motor armature 11 by some suitable proportionality factor. The magnitude of capacitance CF is then determined so that it is related by the inverse of this factor to the magnitude of the capacitance equivalent to the inertia of motor armature 11 and the masses it drives at no-load. This makes the product of inductance LF multiplied by capacitance CF equal to the product of the inductance and capacitance of the analogue RLC circuit at no-load. The effective magnitude of resistances RF and RP is determined so that it is related to the magnitude of the resistance of motor armature 11 by the same proportionality factor as used to select inductance LF. This makes the product of capacitance CF multiplied by resistances RF and RP equal to the product of the capacitance and resistance of the analogue RLC circuit at no-load.

It is understood, of course, that the load on the motor varies as the live load in the car changes and that the live load can change only while the car is stopped at a landing with its doors open. Furthermore, changes in the live load take place at the relatively slow rate at which passengers transfer from the car to the hallways and vice versa. As a result, before the car leaves any landing on a trip to another landing, the load component of the armature terminal voltage substantially reaches the steady state magnitude it will maintain for that trip. During operation capacitor CF of circuit 48 effectively blocks this voltage and prevents it from producing any current flow through the circuit. The current through circuit 48, therefore, is independent of the different steady-state magnitude of the load component of the motor armature terminal voltages but varies as the acceleration component of those voltages varies. By means of a tap on resistor RP a signal proportional to the current through circuit 48 is provided to circuit 46 through resistor $R_{AF}$. This signal represents the acceleration or deceleration, i.e. the first derivative with respect to time of the speed, of motor armature 11.

A signal representing the rate of change of acceleration or deceleration, i.e. the second derivative with respect to time of the speed, of motor armature 11 is provided to circuit 46 through capacitance $C_{AF}$ connected in parallel with resistor $R_{AF}$.

Since the individual components of the system have been identified and the function and arrangement of circuit 48 have been explained, the operation of the system as a whole can now be described.

Assume that car CA is stopped at one of the landings F1–F5, and the elevator system, in any well known manner, receives a signal to start to move the car in an established direction of travel. As the doors close, the car is enabled to move and reference speed signal source 33 begins to generate its prescribed signal. Since it is assumed that the car is stopped, this signal is supplied to summation network 30 and passes unaffected through that piece of equipment to RC lag network 31. Summation network 28 receives an output signal from network 31 and passes it to driving amplifier 26. It is there amplified and transmitted to control device 24 where it causes gate pulses to be generated for the silicon control rectifiers of circuit 22. As these pulses are transmitted to the gates, the direct current generator of the motor generator set is excited by a rectified current which starts to flow from circuit 22 through main field 20. A signal proportional to this current is fed back to network 28 through resistor RGF effectively to eliminate the time constant of main field 20 according to well known principles of feedback control. At the same time the excitation in the generator develops a voltage across generator armature 16 which causes a current to flow through armature 11 of the elevator hoisting motor. As a result the motor begins to run and the elevator car starts to move in the established direction of travel.

It is to be understood that the magnitude and polarity of the amplified signal received by control device 24 in response to the output signal from network 30 determines the time at which gate pulses are generated during each cycle of the alternating current supply applied to circuit 22 between lines S1 and S2. This governs the interval of each cycle of the alternating current supply during which the silicon control rectifiers of circuit 22 conduct. In this way the output signal from network 30 regulates the magnitude and the polarity of the current flowing through main field 20 and controls the output voltage of the direct current generator and the speed of the elevator hoisting motor.

The output signal from network 30 is itself controlled by that of reference speed signal source 33. As a result the motor is accelerated to its running speed as rapidly as is possible without exceeding those magnitudes of acceleration and rate of change of acceleration that the elevator car can undergo and not discomfort the passengers. When a signal to stop at a landing is received, the signal from source 33 causes the motor to decelerate until the car is stopped level with the landing. This latter signal is generated in such a fashion that the deceleration and rate of change of deceleration of the car also do not exceed those magnitudes which are commensurate with passenger comfort.

Throughout the operating cycle of the motor two feedback networks are connected to summation network 30 to apply signals thereto. One of these networks 34 is connected by way of filter 36 and inverting amplifier 38 from summation network 35. The signals provided by network 34 are derived from the three input circuits connected to network 35. The first of these circuits 40 is connected from the voltage divider RDV2 and provides signals which are scaled down versions of the terminal voltages of motor armature 11. The motor armature terminal voltages, as is well known, contain components which determine the speeds of the motor and the derivatives of those speeds with respect to time, as well as components which develop the torques required to overcome the torques acting on the armature because of the loads on the motor. In addition, part of the armature terminal voltages are required to supply the power which is dissipated in losses. The feedback signals produced by voltage divider RDV2 and applied to network 35, therefore, may be said to contain components which represent the speeds of the armature, the derivatives of those speeds with respect to time, the loads the motor is driving and the motor losses.

A second input circuit, 42, is connected to network 35 through resistor RT from tachometer generator 44. This provides signals which according to the scale of the signals from voltage divider RDV2 represent the speeds of the armature. The third of the three input circuits, 46, is connected to network 35 through the parallel resistance capacitance circuit $R_{AF}$–$C_{AF}$ and the inverting amplifier 50 from circuit 48. As previously explained circuit 46 provides signals which represent the first and second derivatives of the motor armature speeds with respect to time. These signals together with those representing speeds which are provided by circuit 42 are applied to network 35 with a polarity opposed to that of the signals provided by circuit 40. In this way network 35 acts upon the signals from its three input circuits to cancel the components of the signals from circuit 40 which represent speeds and their first and second derivatives with respect to time. As a result the output signals from network 35, in effect, contain only those components of the signals from circuit 40 which represent the loads the motor is driving and the motor losses. These components pass through inverting amplifier 38 and filter 36 and are applied through feedback network 34 to summation network 30.

Also connected to summation network 30 is feedback network 32 from voltage dividing circuit RDV1. This circuit produces signals comparable to those produced by voltage divider RDV2. Thus, the feedback signals applied to network 30 through feedback network 32 may also be said to contain components which represent the speeds of the armature, the derivatives of those speeds with respect to time, the loads the motor is driving and the motor losses. By differentially connecting the two feedback signals to network 30, the signals from network 34 cancel out the components of the signals from network 32 which represent the loads the motor is driving and the motor losses. As a result the effective feedback signals applied to network 30 represent only the speeds and their first and second derivatives with respect to time. These signals appear in network 30 with a polarity which is opposed to that of the reference speed signal from source 33. Any output signal from network 30 therefore means that the speed of the motor armature is not in conformity with the desired speed indicated by the pattern signal from source 33. These output, or error signals from network 30 cause the armature speed to be increased or decreased, as the case may be, until it does so conform.

From the foregoing it can be seen that there is provided a closed loop motor control system which uses a control network and a speed responsive signal source in the form of a tachometer generator to extract from the motor armature terminal voltages, signals representing their load components. These signals are employed in conjunction with other signals representing the motor armature terminal voltages and a signal indicating the desired operation of the motor to control the output voltages of a source of voltage of variable magnitude which serves to excite the motor and to control the speeds of its armature.

In addition, it should also be understood that in the disclosed embodiment in which the system is employed to control an elevator motor, the signals extracted from the motor armature terminal voltages as representative of its load components are, according to their polarities and magnitudes, measures of the live loads in the elevator car. As such, they could readily be utilized by those skilled in the elevator art to initiate any of the load responsive control functions that are known to be desirable in elevator operation.

While only one embodiment of the invention has been shown and described, it is contemplated that various modifications may be made without departing from the scope and spirit of the invention. Thus it is presently contemplated that in some installations it might be more desirable to have the magnitude of capacitance CF more closely represent the inertia of armature 11 and the masses it drives when the load on the motor is midway between its no-load value and its maximum load value as opposed to having it represent the inertia at no-load. Furthermore, as is well known, other circuits with various configurations also can be used in place of circuit 48 to synthesize the analogue RLC circuit. Each of such synthesized circuits, however, would be defined by a transfer function (i.e. a mathematical equation which relates the behavior of its output to its input) which is proportioned to the transfer function of the analogue RLC circuit. In other words, each of the transfer functions of these synthesized circuits would be of the same form as that of the analogue RLC circuit and would have one term proportionately corresponding to that term of the transfer function of the analogue RLC circuit which is determined by its capacitance, a second term proportionately corresponding to the term determined by its inductance, and a third proportionately corresponding to the term determined by its resistance. In this way, the said one term of the transfer function of each of these synthesized circuits would be a function of the inertia of the armature of the motor and the masses it drives at no-load, the second term would be a function of the inductance of the motor armature and the third term would be a function of the resistance of the motor armature. For these and other reasons, it is intended that the foregoing subject matter be interpreted as being illustrative of the invention and not be considered limiting in any sense.

What is claimed:
1. A system for controlling the speed of an electric motor which is subjected to a variety of loads, said motor having a control winding for controlling the speed of its rotating element in accordance with the voltages applied across the terminals of said winding, said system comprising:
   a source of voltage of variable magnitude having an input circuit and an output circuit, said output circuit being connected across the terminals of said control winding to apply voltages thereacross in accordance with signals applied to said input circuit;
   means generating a predetermined signal, said means being connected to said input circuit to apply said predetermined signal thereto;
   two separate feedback networks connected to said input circuit to apply feedback signals thereto;
   each of said feedback networks including an individual voltage dividing circuit connected across the terminals of said control winding to derive signals proportional to the voltages applied across said terminals;
   one of said feedback networks also including both a speed responsive signal source responsive to the achieved speeds of said rotating element to produce signals indicative of said speeds, and a control network responsive to the components of said terminal voltages which determine the derivatives of said achieved speeds with respect to time for deriving signals indicative of the first and second of said derivatives, said control network including a circuit connected across the terminals of said control winding definable by a transfer function having one term which is a function of the inertia of the rotating element of the motor and the masses it drives when it is subjected to a predetermined one of its various loads, a second term which is a function of the inductance of the control winding of the motor, and a third term which is a function of the resistance of said control winding;
   said latter feedback network including means for combining the signals derived therein to obtain signals representative of the various load torques acting on the motor;
   said last mentioned signals and said signals derived in the other feedback network being combined with said predetermined signal in the input circuit of said voltage source to control the output voltages thereof.

2. A system according to claim 1, in which the motor is a direct current motor, the control winding is the armature winding of the motor, and the speed responsive signal source is a tachometer generator coupled to the shaft of said armature.

3. A system according to claim 2, in which the control network circuit is an electrical analogue of the electromechanical system including the motor and the masses it drives when subjected to said predetermined load.

4. A system according to claim 2, in which said control network circuit includes a resistance, inductance and capacitance connected in a series circuit arrangement, the magnitude of the resistance being proportioned to the resistance of the motor armature, the magnitude of the inductance being proportioned to the inductance of the motor armature and the magnitude of the capacitance being proportioned to the inertia of the armature of the motor and the masses it drives with said predetermined load on the motor so that the current flowing through said circuit as a result of the terminal voltage applied across said motor armature when the motor is subjected to said predetermined load is substantially a miniature reproduction of the acceleration component of the current flowing through said motor armature.

5. A system according to claim 4, in which the product of the capacitance and inductance of said control network circuit is substantially equal to the product of the magnitude of a capacitance equivalent to the inertia of the armature of the motor and the masses it drives at said predetermined load multiplied by the magnitude of the inductance of said motor armature.

6. A system according to claim 5, in which the product of the capacitance and resistance of said control network circuit is substantially equal to the product of the magnitude of the capacitance equivalent to the inertia of the armature of the motor and the masses it drives at said predetermined load multiplied by the magnitude of the resistance of said motor armature.

7. A system, according to claim 6, in which said control network includes a parallel resistance capacitance circuit connected between said series connected resistance, inductance and capacitance and the input circuit of said source of voltage.

8. In a system for controlling the operation of an elevator car by controlling the speed of the motor which drives the car in accordance with the magnitudes of the terminal voltages applied across a control winding of the motor, in which system said terminal voltages determine both the speeds of the rotating element of the motor and the derivatives with respect to time of those speeds, as well as the torques required to overcome the torques acting on the rotating element because of the loads in the elevator car, a voltage divider connected across the control winding to derive signals representative of its terminal voltages, a speed responsive signal source responsive to the speeds of said rotating element to derive signals indicative of said speeds, a control network responsive to the components of said terminal voltages which determine the derivatives of the speeds of said rotating element with respect to time for deriving signals indicative of the first and second of said derivatives, and means for differentially combining said voltage divider signals with said speed indicating signals and said control network signals to obtain signals indicative of the loads in the elevator car.

9. In a system according to claim 8, in which said control network includes a circuit connected across said control winding definable by a transfer function having one term which is a function of the inertia of the rotating element of the motor and the masses it drives when said elevator car is carrying a predetermined load, a second term which is a function of the inductance of said control winding, and a third term which is a function of the resistance of said control winding.

10. In a system according to claim 9, in which the motor is a direct current motor, the control winding is the armature of the motor, and the speed responsive signal source is a tachometer generator coupled to the shaft of said armature.

11. In a system according to claim 10, in which said control network circuit is an electrical analogue of the electro-mechanical system including the motor and the masses it drives with said predetermined load in said elevator car.

12. In a system according to claim 10, in which said control network circuit includes a resistance, inductance and capacitance connected in a series circuit arrangement, the magnitude of said resistance being proportioned to the resistance of the motor armature, the magnitude of said inductance being proportioned to the inductance of the motor armature and the magnitude of said capacitance being proportioned to the inertia of the armature of said motor and the masses it drives with said predetermined load in said elevator car.

13. In a system according to claim 12, in which the product of the capacitance and inductance of said control network circuit is substantially equal to the product of the magnitude of a capacitance equivalent to the inertia of the armature of said motor and the masses it drives when the elevator car is carrying said predetermined load multiplied by the magnitude of the inductance of said motor armature.

14. In a system according to claim 13, in which the product of the capacitance and resistance of said control network circuit is substantially equal to the product of the magnitude of the capacitance equivalent to the inertia of the armature of said motor and the masses it drives when the elevator car is carrying said predetermined load multiplied by the magnitude of the resistance of said motor armature.

15. In a system according to claim 14, in which said control network also includes a parallel resistance capacitance circuit connected to the resistance of said series connected resistance, inductance and capacitance.

References Cited
UNITED STATES PATENTS

| | | | |
|---|---|---|---|
| 2,918,987 | 12/1959 | Haase et al. | 187—29 |
| 3,297,110 | 1/1967 | Bagnasco | 187—29 |
| 3,350,612 | 10/1967 | Hansen et al. | 318—143 |

ORIS L. RADER, Primary Examiner

W. E. DUNCANSON, JR., Assistant Examiner

U.S. Cl. X.R.

318—143; 187—29